United States Patent [19]

Wheeler

[11] Patent Number: 5,262,054
[45] Date of Patent: Nov. 16, 1993

[54] PROCESS FOR OPENING REVERSE OSMOSIS MEMBRANES

[75] Inventor: James W. Wheeler, Fairport, N.Y.

[73] Assignee: E. I. Du Pont de Nemours and Company, Wilmington, Del.

[21] Appl. No.: 998,486

[22] Filed: Dec. 30, 1992

[51] Int. Cl.$^5$ ............................................. B01D 61/10
[52] U.S. Cl. .................................. 210/639; 210/654; 210/500.38
[58] Field of Search .................... 210/639, 654, 500.38

[56] References Cited

U.S. PATENT DOCUMENTS

| | | | |
|---|---|---|---|
| 4,259,183 | 3/1981 | Cadotte | 210/654 |
| 4,277,344 | 7/1981 | Cadotte | 210/654 |
| 4,769,148 | 9/1988 | Fibiger et al. | 210/500.38 |
| 4,828,700 | 5/1989 | Fibiger et al. | 210/500.32 |
| 4,938,872 | 7/1990 | Strantz et al. | 210/639 |

Primary Examiner—Frank Spear

[57] ABSTRACT

The salt passage of a reverse osmosis membrane is increased by: (a) contacting the membrane with ions to form a membrane-ion complex; (b) treating the membrane-ion complex with an aqueous solution of an alkali metal permanganate to form manganese dioxide crystals in the membrane; and (c) dissolving the manganese dioxide crystals. The process can be repeated any number of times to further open the membrane.

13 Claims, No Drawings

PROCESS FOR OPENING REVERSE OSMOSIS MEMBRANES

FIELD OF THE INVENTION

This invention relates to a process for opening reverse osmosis membranes to form nanofiltration membranes and more particularly to a process for reopening already opened reverse osmosis membranes.

BACKGROUND OF THE INVENTION

A number of treatments for reverse osmosis membranes are known. Most of these treatments fall into two classes; to tighten up the membrane, which reduces salt passage, or to clean a fouled membrane, which increases the permeate flow rate without increasing the salt passage through the membrane. A few methods are also known which increase the salt passage through a membrane. For example, U.S. Pat. No. 4,938,873, teaches for opening polyamide reverse osmosis (RO) membranes by treating the membrane with aqueous, acidic permanganate solution and then stabilizing the membrane with an aqueous solution of alkali metal bisulfite or hydrogen peroxide.

A disadvantage in this process of opening membranes, however, is that it has very little process latitude. That is to say that it is very difficult to control the degree to which the membrane is "opened" by the process, and even more difficult to further increase the degree of opening with further processing. Monitoring the opening process during the permanganate treatment is not entirely possible, because some ions, sulfate for example, don't pass through the membrane until after the stabilizing treatment. In addition, the process time varied considerably from membrane to membrane, thus rendering the process erratic and unpredictable.

Some membranes can also be opened by hydrolysis. Cellulose acetate membranes show increased salt permeability after hydrolysis by either very high or very low pH solutions. Usually these membranes show poor selectivity, i.e., they allow passage of both salts and larger organic molecules.

SUMMARY OF THE INVENTION

The present invention comprises a process for opening a reverse osmosis membrane comprising:

(a) contacting the membrane with ions to form a membrane-ion complex;

(b) treating the membrane-ion complex with an aqueous solution of an alkali metal permanganate to form manganese dioxide crystals in the membrane; and (c) dissolving the manganese dioxide crystals.

The preferred ion for use in the process is divalent manganese, $Mn^{+2}$. Other ions can also be used as long as they form a complex with the reverse osmosis membrane, are oxidized by permanganate, and can be removed with further treatment. The addition of the ions forms an ion-membrane complex and provides a renewable source of sites in the membrane which can catalyze or initiate the permanganate reaction and allows retreatment of the membrane if it was not originally opened enough for the desired application. Membranes can be retreated any number of times without damage.

During the process, the permeate flow and conductivity increase smoothly. The change in permeate conductivity is especially useful for monitoring the degree of opening of the membrane during the process.

DETAILED DESCRIPTION OF THE INVENTION

In membrane separation technology, membranes are generally classified by the size or molecular weight of material they will retain, i.e., the material which will not pass through the membrane. In conventional nomenclature Microfiltration (MF) membranes generally retain suspended particles down to about 0.2 microns. Ultrafiltration membranes (UF) generally can be prepared to retain dissolved molecules down to 10,000 or 5,000 molecular weight. Reverse osmosis (RO) membranes generally are made to retain all dissolved molecules and ions. Typically salt (sodium chloride) retention (or rejection) for RO membranes is above 95 percent, and preferably above 98 percent. RO membranes are generally used to produce pure water from water containing dissolved salts.

This invention relates to membranes which range in retention between RO and UF membranes. These are called Nanofiltration (NF) membranes. They retain large organic molecules which have a molecular weight of approximately 400 or greater, such as dyes, but they pass small ions and molecules. NF membranes can be used to remove salts from dye solutions. Another application is the removal of dyes from a waste water stream. Some NF membranes pass only monovalent ions like chloride and can be used to soften water.

The process of this invention can be used to produce NF membranes which will pass both sodium chloride and sodium sulfate. These membranes are especially useful when a dye must be separated from a solution containing sulfate ions.

Diafiltration, as the term is generally used in the literature, is either a continuous or discontinuous process. In continuous diafiltration, a liquid is maintained at a fixed volume while it is contacted under pressure with a semipermeable membrane. Solvent with some dissolved materials pass through the membrane. In discontinuous diafiltration, salts are remove by repeated concentration and, dilution. Diafiltration may be practiced using an MF, UF or HF membrane.

Reverse osmosis membranes that may be treated using the process of the invention to form nanofiltration membranes are formed from polyamides. They may be of the asymmetric type such as disclosed in U.S. Pat. No. 3,567,632 or the composite thin film type such as those formed by interfacial polymerization. This latter type disclosed in U.S. Pat. Nos. 4,277,344; 4,520,044; 4,529,646; 4,626,468; 4,643,829; 4,783,346; and in U.S. patent application Ser. No. 341,037, filed on Apr. 20, 1989. Some other reverse osmosis membranes that may be treated using this process are described in U.S. Pat. Nos. 4,259,183, 4,769,148 and 4,828,700.

The asymmetric type of polyamide reverse osmosis membranes generally are formed by polymerizing a diamine such as meta-phenylene diamine with an acid chloride such as isophthaloyl chloride, terephthaloyl chloride, trimesoyl chloride, cyclohexane-1,3,5-tricarbonyl chloride, or mixtures thereof followed by casting or extruding a film or hollow fiber. Solvent is preferentially removed from one side of the film or hollow fiber followed by quenching in a non-solvent for the polymer to freeze in the asymmetric structure. If desired, part of the diamine may be substituted with sulfonic acid groups or salts of sulfonic acid groups.

The interfacially polymerized type of polyamide reverse osmosis membrane generally is prepared by casting and partially drying a solution of a polymer (preferably an aromatic polysulfone) to form a microporous film, or tube, and quenching the cast film or tube to freeze it in its microporous structure which generally has pores less than 20 nm in diameter. The resulting microporous film or tube is immersed in a dilute solution of a diamine, such as piperizine or meta-phenylenediamine in water, freed of excess diamine solution, and then immersed in a solution of acid chlorides (such as trimesoyl chloride, cyclohexane-1,3,5-tricarbonyl chloride or mixtures thereof) in a solvent which is immiscible with water, such as a chlorofluorocarbon. Up to 70 mole percent of the trimesoyl chloride and/or cyclohexane-1,3,5-tricarbonyl chloride can be replaced with a difunctional acyl chloride which can be an aliphatic diaryl chloride containing 4 to 12 carbon atoms, isophthaloyl chloride, terephthaloyl chloride cyclohexane dicarbonyl chlorides or mixtures thereof.

Suitable commercially available membranes include Desal ® SG-6 membranes, marketed by Desalination Systems, Inc., Escondido, Calif.; FilmTec ® SW-30 and FilmTec ® SW-30-HR, marketed by Dow Chemical, Midland Mich.; and HF, marketed by Tricep, Golita, Calif. Before treatment with the process of the present invention, these membranes generally have a sodium chloride passage of less than 2% preferably less than 1%, and most preferably less than 0.5%.

Some nanofiltration membranes may also be treated by the process of this invention to increase their degree of openness. Suitable commercially available membranes include Desal ® DK-5 membranes, marketed by Desalination Systems, Inc., Escondido, Calif.; and FilmTec ® NF-40 and NF-70, marketed by Dow Chemical, Midland Mich. Desal ® DK-5 is a thin film membrane which falls into the overlap region between reverse osmosis and ultrafiltration with an approximate cut-off molecular weight (MWCO) of 100 to 150 for uncharged organic molecules. The Desal ® DK-5 membrane is believed to be a piperazine-based membrane. Untreated Desal ® DK-5 membranes typically have a salt passage on NaCl solution of 40-50wt. %. The MWCO of the opened membranes is significantly less than the 5000 to 100,000 MWCO ultrafiltration membranes of U.S. Pat. No. 4,786,417. Preferably, the MWCO is greater than 150 and less than 1000.

As already mentioned, it is known from U.S. Pat. No. 4,938,872 that these reverse osmosis membranes can be treated with alkali metal permanganate and particularly $KMnO_4$ in an acidic solution, followed by stabilization, to produce a membrane with increased salt (and sugar) passage and permeate flow. These "special" membranes have been used to concentrate various fruit juices, concentrate salt solutions well above typical reverse osmosis limits, and separate dye from concentrated salt solutions to recover water and salt-free dye. Asymmetric hollow fiber polyamide reverse osmosis membranes, when opened, often can be operated at feed pressures above recommended pressure limits set to avoid collapsing the hollow fiber.

The problem with these membranes is that once they have been treated they cannot be retreated to further open the membrane.

The process of the invention involves contacting the (or untreated) reverse osmosis membranes with ions to form a membrane-ion complex. Any ion which is oxidized by acidic permanganate can be used, as long as it complexes with (i.e., is held by) the membrane and is not washed out by deionized water. It is preferable that the oxidized form of this ion is easily removed from the membrane after the permanganate treatment. The ion is preferably soluble in water at a pH above 4.0. If the oxidized form of the ion cannot be removed from the membrane, it preferably does not have a deleterious effect on the membrane performance.

Some useful inorganic ions include divalent manganese ($Mn^{+2}$, manganous), divalent tin ($Sn^{+2}$, stannous) and divalent iron ($Fe^{+2}$, ferrous) Other ions which are expected to be siutable are divalent lead ($Pb^{+2}$), monovalent gold ($Au^+$), monovalent thallium ($Tl^+$), and trivalent uranium ($U^{+3}$). Some of these ions are not preferred because of concerns of toxicity, environment, or expense. Of the inorganic ions, divalent manganese is preferred because it is readily available, inexpensive, and convenient to use. Organic ions may also be used. Amine salts are generally oxidizable by permanganate. Examples of useful amine salts are hydroxylamine hydrochloride and ethanolamine hydrochloride. The amounts of each ion needs to be determined empirically. The concentrations have not been found to be critical.

Following the formation of the membrane-ion complex, the membrane is treated with a dilute aqueous solution of an alkali metal permanganate, such as an aqueous solution containing 0.02 to 5.0 wt. % alkali metal permanganate to form manganese dioxide crystals in the membrane. The length of time needed for this step will generally range from 30 minutes to 50 hours for the asymmetric membranes and as little as 30 seconds for the composite membranes. Generally the pH should be adjusted to 2.3-3.0 for the asymmetric type membranes with higher but still acidic pH's being preferred for the composite type membranes. Treatment at pH 7 or above tends to be slower but is satisfactory for use with composite membranes. There is a tendency for a brown deposit to form on the membrane when using a pH above 7. Sulfuric acid is preferred to adjust the pH, but other acids such as hydrochloric acid can be used.

Generally, in carrying out this step, the acidified permanganate solution is circulated through the membrane at 50-100 psig (345-690 kPa). The pressure does not appear to be critical, but sufficient pressure is desirable to obtain some permeate flow to permit measurement of permeate conductivity. This allows a determination of when to end the permanganate treatment to achieve the desired final salt passage. The membranes can be opened by a static exposure to the solution, but determining the end point is more difficult and the process requires more time, particularly for the asymmetric membranes.

The amount of alkali metal permanganate used is more a function of the surface area of the membrane being treated than concentration of the solution being used. The alkali metal permanganate is consumed during the treatment and enough must be present to bring about the desired opening of the membrane. Accordingly, the concentration of alkali metal permanganate used is not particularly critical, as a larger volume of dilute solution can produce the same degree of opening as a smaller volume of a more concentrated solution. Generally, an alkali metal permanganate concentration of from 0.02 to 5 g/L is satisfactory. At very high concentrations of alkali metal permanganate, and particularly when using a low pH, control of the desired amount of opening of the membrane can become difficult, since the amount of opening is very time dependent.

After the permanganate treatment step, the manganese dioxide crystals are dissolved by treating the membrane with a solution of any reagent which can reduce manganese dioxide. Preferably the oxidized form of this reagent is water soluble and is not held by the membrane. Some examples of suitable reagents include sodium nitrite, potassium iodide and sodium bisulfite. A dilute solution of hydrogen peroxide may also be used. The membrane may be flushed with water to remove excess permanganate before the reagent is added. An aqueous solution of 0.25 to 5 wt. % alkali metal bisulfite or 0.01 to 0.1 wt. % hydrogen peroxide is preferred.

It has been observed that this last step also serves to stabilize the membrane in that when this step is omitted, the membranes continue to open, even after flushing with water, for a period of several months. This is undesirable in use, because the salt passage of the membranes affects other control parameters in the process for which the membrane is intended. Membranes stabilized in accordance with the present invention promptly achieve final salt passage and do not continue to open over time. This is an important advantage for most end uses, such as purifying dyes and concentrating fruit juices.

After the stabilization step, the membrane is flushed with water.

The process can be repeated any number of times to further open the membrane until the desired degree of salt passage is obtained, which is a significant advantage over the known prior art methods of opening membranes. It will be apparent to even the unskilled reader that the amount of opening of the membrane depends upon the intended use of the membrane. For example, for the removal of sulfate from a dye solution, a sodium sulfate passage of 4-12% may be desirable, for desalination of brackish water a sodium chloride passage of 7% may be desirable, whereas for the final concentration step in processing orange juice a sodium chloride passage of as high as 70% to 98% is often desirable. With the present process, membranes can readily be treated to provide a complete range of salt passages as may be desired for various end use applications.

EXAMPLES

The following examples are used to demonstrate this invention.

DEFINITIONS

Membrane flushing: washing the membrane in place until the permeate and concentrate (return) water measures less than 10 μmho conductivity.

Salt passage: the conductivity of the permeate divided by the conductivity of the feed solution.

EXAMPLE 1

The following experiment shows that manganese is held by the membrane:

A FilmTec ® SW-HR membrane was disassembled. Two-inch sheets of the membrane were cut for treatment. Sheet A was washed in deionized water and was used as the control. Sheet B was first soaked in a solution of deionized water containing 1.0 g/L manganese nitrate (pH 4.5), and then washed in deionized water. Sheet C was treated as the second sheet and then soaked one hour in a 0.5 g/L potassium permanganate solution (pH 3.5). It was then washed in deionized water. Sheets A and B appeared white. Sheet C was slightly yellow. This was assumed to be manganese dioxide. All three sheets were submitted for ESCA analysis. Manganese was found to be present in sheets B (0.2 atom percent) and C (0.3 atom percent). Manganese was not detected in sheet A. The detection limit was about 0.1 atom percent. This shows that the manganese +2 ion is held by the membrane. It also shows that manganese is present in the membrane after the permanganate treatment.

EXAMPLE 2

A Tricep 2.3"×40" (5.84 cm×101.6 cm) spiral membrane was flushed with 18 megaohm deionized water. The membrane was then calibrated with 1 g/L sodium chloride solution and with 2.5 g/l sodium sulfate solution. The conditions used were 20° C., 150 psi feed pressure, and 12 liters per minute feed flow. Salt passage for the sodium chloride was 5.6 percent and for the sodium sulfate was 0.5 percent. The permeate flow rate was 890 mls per minute. The membrane was flushed before and after each calibration and treatment.

The flushed and calibrated membrane was then treated with 10 liters of a 1 g/L solution of manganese (II) nitrate solution at pH 4.5 for 15 minutes at 100 psi feed pressure. After flushing, it was treated with 12 liters of 0.5 g/L of potassium permanganate solution which had been adjusted to pH 3.5 with dilute sulfuric acid. Feed pressure was 100 psi and flow rate was 12 liters per minute. Initial salt passage with the permanganate solution was 7.5 percent. After the salt passage reached 19 percent, the conductivity of the permanganate solution was increased to 1,850 μmho by addition of 32 mls a 20% sodium chloride solution. Throughout the permanganate treatment, the solution was held at pH 3.5-3.6 by addition of 3 molar sulfuric acid. When the salt passage reached 31 percent, the treatment was quenched by adding one liter of a 10% sodium metabisulfite solution to the permanganate solution and circulating at 100 psi for 15 minutes. After the membrane was flushed, it was recalibrated. Salt passage for sodium chloride had increased to 52.4 percent and for sodium sulfate had increased to only 0.7 percent. The permeate flow rate had increased to 1,150 mls per minute.

To further increase the salt passage, the membrane was treated again with first the manganese (II) nitrate solution and then the potassium permanganate solution as described above. This time the initial salt passage for the permanganate solution was 57.7 percent. After the passage increased to 60.5 percent, 30 grams of a 20% sodium chloride solution were added to the permanganate solution to give a conductivity of 1,840 μmho. When the salt passage increased to 73 percent, sodium metabisulfite solution was added as above to stop the treatment. The membrane was flushed and recalibrated. Salt passages were 64.1 percent for sodium chloride and 1.0 percent for sodium sulfate. The permeate flow rate had increased to 1,240 mls per minute.

The membrane was treated a third time with the manganese (II) nitrate solution and then the potassium permanganate solutions as described above. The initial salt passage for the permanganate solution was 76.3 percent. After the passage increased to 78.8 percent, 29 grams of a 20% sodium chloride solution were added to the permanganate solution to give a conductivity of 1,830 μmho. When the salt passage increased to 85.9 percent, sodium metabisulfite solution was added as above to stop the treatment. The membrane was flushed and recalibrated. Salt passages were 82.5 percent for sodium chloride and 7.4 percent for sodium sulfate. The permeate flow rate had increased to 1,600 mls per minute.

This treatment shows that a membrane can be retreated a number of times to smoothly open it to the desired salt passage.

EXAMPLE 3

A FilmTec ® SW-30-HR 2.5"×40" (6.35 cm×101.6 cm) membrane was opened as in Example 2 with a permanganate treatment to a salt passage of 42.4 percent with sodium chloride and 0.4 percent with sodium sulfate. The permeate flow rate was 1,800 mls per minute.

The membrane was treated again with a manganese (II) nitrate solution which had been adjusted to pH 2.5 with nitric acid. The potassium permanganate solution treatment was started as described in Example 2. This time the initial salt passage for the permanganate solution was 49.2 percent. The salt passage gradually decreased to 47.0 percent over the one hour treatment. Sodium metabisulfite solution was added as in Example 2 to stop the treatment. The membrane was flushed and recalibrated. Salt passages and the permeate flow rate were unchanged.

The membrane was treated with a 4.5 pH manganese (II) nitrate solution and then the potassium permanganate solutions as described in Example 2. After the passage increased to 73.3 percent, 37 grams of a 20% sodium chloride solution was added to the permanganate solution to give a conductivity of 1,840 μmho. When the salt passage increased to 81.5 percent, sodium metabisulfite solution was added as above to stop the treatment. The membrane was flushed and recalibrated. Salt passages were 62.9 percent for sodium chloride and 2.8 percent for sodium sulfate. The permeate flow rate had increased to 1,940 mls per minute.

EXAMPLE 4

A FilmTec ® NF-40 2.5"×40" (6.35 cm×101.6 cm) membrane was opened with a permanganate treatment to a salt passage of 52.8 percent with sodium chloride. The permeate flow rate was 980 mls per minute.

The membrane was treated with a 4.5 pH manganese (II) nitrate solution and then the potassium permanganate solutions as described in Example 2. Initial salt passage with the permanganate solution was 78.1 percent. After the passage increased to 84.7 percent, sodium chloride solution was added to the permanganate solution to give a conductivity of 1,843 μmho. When the salt passage increased to 81.9 percent, sodium metabisulfite solution was added as above to stop the treatment. The membrane was flushed and recalibrated. Salt passage was 66.5 percent for sodium chloride and 6.4 percent with sodium thiosulfate. Passage of sodium thiosulfate had not been previously checked. The permeate flow rate had increased to 1,235 mls per minute.

EXAMPLE 5

A FilmTec ® SW-30 2.5"×14" (6.35 cm×35.56 cm) membrane was opened with a permanganate treatment to a salt passage of 26.6 percent with sodium chloride. The permeate flow rate was 420 mls per minute.

The membrane was treated again with 10 L of a 1 g/L solution of ferrous chloride. Salt passage of the ferrous chloride was 36.8 percent. The potassium permanganate solution treatment was started as described in Example 2. This time the initial salt passage for the permanganate solution was 60.9 percent. When the salt passage had increased to 71.2 percent, sodium metabisulfite solution was added as in Example 2 to stop the treatment. The membrane was flushed and recalibrated. Salt passage for sodium chloride had increased to 30.0 percent and the permeate flow rate had decreased to 390 mls per minute. It was suspected that the ferrous or ferric ions had partially fouled the membrane. The membrane was "cleaned" by treating it with a 2% sodium citrate and 2% trisodium EDTA solution which had been adjusted to pH 7.7 with dilute sulfuric acid for ten minutes at 150 psi. After this "cleaning," the salt passage for sodium chloride was measured as 29.8 percent and the permeate flow had increased to 480 mls per minute. This shows that although Fe+2 (ferrous ion) will initiate the permanganate reaction, it is not preferred because it may foul the membrane.

EXAMPLE 6

A Desal DK 2.5"×40" (6.35 cm×101.6 cm) membrane was opened with a permanganate treatment to a salt passage of 18.5 percent with sodium chloride and 2.3 percent with sodium sulfate. The permeate flow rate was 1,200 mls per minute.

The membrane was treated the potassium permanganate solutions as described in Example 2, except no manganese (II) nitrate solution pretreatment was done. Initial salt passage with the permanganate/chloride solution was 50.6 percent. During the treatment the passage decreased to 41.6 percent. The permeate flow rate decreased from 70 to 30 liters per hour. Sodium metabisulfite solution was added as above to stop the treatment. The membrane was flushed and recalibrated. Salt passage of sodium chloride and sodium sulfate were unchanged.

The membrane was then treated with a 1 g/L manganese (II) nitrate solution. The potassium permanganate solution treatment was started as described in Example 2. During the treatment the salt passage for the permanganate/chloride solution increased from 28.9 to 34.2 percent. Sodium metabisulfite solution was added as above to stop the treatment. The membrane was flushed and recalibrated. Salt passages were 47.8 percent for sodium chloride and 7.1 percent for sodium sulfate. The permeate flow rate had increased to 1,750 mls per minute.

EXAMPLE 7

A Desal SG 2.5"×40" (6.35 cm×101.6 cm) spiral membrane was flushed with 18 megaohm deionized water and calibrated as in Example 2. Salt passage for the sodium chloride was 1.5 percent and for the sodium sulfate was 0.8 percent. The permeate flow rate was 780 mls per minute.

The membrane was treated with 10 L of a 1 g/L solution of manganese (II) nitrate solution at pH 4.5 for 15 minutes at 100 psi feed pressure. During this treatment, the salt passage for the manganese nitrate was 11.2 percent. After the membrane was flushed, it was next treated with 12 liters of 0.5 g/L of potassium permanganate solution which had been adjusted to pH 3.5 with dilute sulfuric acid. Feed pressure was 100 psi and flow rate was 12 liters per minute. Initial salt passage with the permanganate solution was 1.8 percent. After ten minutes, the conductivity of the permanganate solution was increased to 1,820 μmho by addition of sodium chloride solution. Throughout the permanganate treatment, the solution was held at pH 3.5–3.6 by addition of 3 molar sulfuric acid. When the salt passage reached 5.3 percent, the treatment was quenched by adding 1L of a 10% sodium metabisulfite solution to the permanganate solution and circulating at 100 psi for 15 minutes. After the membrane was flushed, it was recalibrated. Salt passage for sodium chloride had increased to 9.4 percent. Sodium sulfate passage remained at 0.8 percent. The permeate flow rate had increased to 1,200 mls per minute.

The membrane was treated again with the manganese (II) nitrate solution and then the potassium permanganate solution as described above. Salt passage during the manganese nitrate treatment was 60 percent. This time the initial salt passage for the permanganate solution was 14.6 percent. After the passage increased to 16.4 percent, 38 grams of a 20% sodium chloride solution were added to the permanganate solution to give a conductivity of 1,860 μmho. When the salt passage increased to 24.9 percent, sodium metabisulfite solution was added as above to stop the treatment. The membrane was flushed and recalibrated. Salt passages were 12.5 percent for sodium chloride and 1.4 percent for sodium sulfate. The permeate flow rate was 1,260 mls per minute.

The membrane was treated a third time with the manganese (II) nitrate solution and then the potassium permanganate solutions as described above. The initial salt passage for the permanganate solution was 25.3 percent. When the salt passage increased to 29.6 percent, sodium metabisulfite solution was added as above to stop the treatment. The membrane was flushed and recalibrated. Salt passages were 18.0 percent for sodium chloride and 4.8 percent for sodium sulfate. The permeate flow rate had increased to 1,600 mls per minute.

EXAMPLE 8

A FilmTec ® SW-30 2.5"×14" (6.35 cm×35.56 cm) membrane was opened with a permanganate treatment to a salt passage of 30.0 percent with sodium chloride. The permeate flow rate was 480 mls per minute as described in Example 5. The membrane was treated again with a solution of a ten grams of stannous chloride in ten liters of water. Salt passage of the stannous chloride was 96.7 percent. The potassium permanganate solution treatment was started as described in Example 2. This time the initial salt passage for the permanganate solution was 63.6 percent. When the salt passage had increased to 72.7 percent, sodium metabisulfite solution was added as in Example 2 to stop the treatment. Fifty grams of sodium citrate were also added to the sodium metabisulfite solution. The membrane was flushed and recalibrated. Salt passage for sodium chloride had increased to 57.3 percent and the permeate flow rate had increased to 528 mls per minute. This preparation shows that stannous ion can initiate the opening process.

EXAMPLE 9

A FilmTec ® SW-30 2.5"×14" (6.35 cm×35.56 cm) membrane was opened with a permanganate treatment to a salt passage of 57.3 percent with sodium chloride. The permeate flow rate was 528 mls per minute as seen in Example 8. The membrane was treated with a solution of a ten grams of hydroxylamine hydrochloride in ten liters of water which had a pH of 5.2. Salt passage of the hydroxylamine hydrochloride was 61.6 percent. The potassium permanganate solution treatment was started as described in Example 2. This time the initial salt passage for the permanganate solution was 73.2 percent. When the salt passage had increased to 85.8 percent, the permanganate solution was flushed from the membrane. Hydroxylamine hydrochloride solution (40 grams in 10 liters of water) were added to dissolve the manganese dioxide. The membrane was flushed and recalibrated. Salt passage for sodium chloride had increased to 59.1 percent and the permeate flow rate was 470 mls per minute. Salt passage was 4.2 percent for sodium sulfate at pH 5.1; 12.3 percent for sodium phosphate (at a 3.5 gram per liter concentration and at a pH of 8.0); 11.9 percent for sodium dodecylsulfate (at 4.0 grams per liter); and 2.4 percent for sodium citrate (at 4.0 grams per liter).

This preparation shows that hydroxylamine hydrochloride can be used to start the opening reaction. It also shows that hydroxylamine hydrochloride can be used to stabilize the membrane after the permanganate treatment.

EXAMPLE 10

A FilmTec ® SW-30 2.5"×14" (6.35 cm×35.56 cm) membrane was opened with a permanganate treatment to a salt passage of 21.9 percent with sodium chloride. The permeate flow rate was 1240 mls per minute. The membrane was then treated with a solution of a ten grams of ethanolamine hydrochloride in ten liters of water which had a pH of 5.2. Salt passage of the ethanolamine hydrochloride was 26.1 percent. The potassium permanganate solution treatment was started as described in Example 2. This time the initial salt passage for the permanganate solution was 58.2 percent. When the salt passage had increased to 68.4 percent, sodium metabisulfite solution was added as in Example 2 to stop the treatment. The membrane was flushed and recalibrated. Salt passage for sodium chloride had increased to 27.8 percent and the permeate flow rate was measured at 1,230 mls per minute.

This preparation shows that ethanolamine hydrochloride can initiate the opening process.

EXAMPLE 11

A FilmTec ® SW-30 2.5"×14" membrane was opened as described in Example 3. The salt passage of the membrane was 59.1 percent to sodium chloride and 4.2 percent to sodium sulfate. 14 liters of a 7.14% solution of C.I. Acid Yellow 23 (tartrazine; FD&C Yellow No. 5, molecular weight 534.37) at pH 7.0 were prepared which contained 1,370 ppm sulfate as measured by ion chromatography. This solution was processed through the membrane at 150 psi, 12 liters per minute feed flow, and 330 mls permeate per minute. Deionized water was added to the dye solution as the permeate was removed. After 10 liters of permeate had been removed, the sulfate level in the dye solution had been reduced to 800 ppm and 11.4 grams (1.14 percent of the batch) of dye had been lost in the permeate. After 50 liters of permeate had been removed, the sulfate level in the dye solution was 100 ppm and 56.8 grams of the dye had been lost.

This shows that sulfate can be removed from Acid Yellow 23 with a minimal dye loss.

EXAMPLE 12

A FilmTec ® SW-30-HR 2.5"×40" membrane was opened as described in Example 3. The salt passage of the membrane was 60.3 percent to sodium chloride and 4.5 percent to sodium sulfate. 18 liters of a 6.2 percent solution of C.I. Acid Red 52 (Sulforhodamine B, molecular weight 580.66) was prepared which contained 16,020 ppm chloride and 5,170 ppm sulfate. This solution was processed through the membrane at 150 psi, 2° C., 12 liters per minute feed flow, and 670 mls permeate per minute. Deionized water was added to the dye solution as the permeate was removed. After 90 liters of permeate had been removed, the chloride level had dropped to 24 ppm and the sulfate level in the dye solution had been reduced to 450 ppm. 11.7 grams (1.4 percent of the batch) of dye had been lost in the permeate.

This shows that chloride and sulfate can be removed from Acid Red 52 with minimal dye loss.

What is claimed is:

1. A process for increasing the salt passage of a reverse osmosis membrane comprising:
   (a) contacting the membrane with ions to form a membrane-ion complex;
   (b) treating the membrane-ion complex with an aqueous solution of an alkali metal permanganate to form manganese dioxide crystals in the membrane; and
   (c) dissolving the manganese dioxide crystals.

2. The process of claim 1, wherein the membrane is an asymmetric hollow fiber polyamide reverse osmosis membrane.

3. The process of claim 1, wherein the membrane is an asymmetric thin film polyamide reverse osmosis membrane.

4. The process of claim 1, wherein the membrane is a thin film composite hollow fiber polyamide reverse osmosis membrane.

5. The process of claim 1, wherein the membrane is a thin film composite polyamide reverse osmosis membrane.

6. The process of claim 1, wherein step (a) comprises contacting the membrane with an inorganic ion selected from the group of divalent manganese, divalent tin, divalent iron, divalent lead, monovalent gold, monovalent thallium and trivalent uranium.

7. The process of claim 1, wherein step (a) comprises contacting the membrane with an organic amine salt selected from the group of hydroxylamine hydrochloride and ethanolamine hydrochloride.

8. The process of claim 1, wherein step (b) comprises treating the membrane-ion complex with an aqueous solution of 0.02 to 0.5 wt. % of an alkali metal permanganate.

9. The process of claim 1, wherein step (b) comprises treating the membrane-ion complex with an aqueous solution of 0.2 to 1.0 wt. % of an alkali metal permanganate.

10. The process of claim 1, wherein step (b) comprises treating the membrane-ion complex for 30 seconds to 50 hours.

11. The process of claim 1, wherein step (c) comprises dissolving the manganese dioxide crystals with a reagent selected from the group of sodium nitrite, potassium iodide, sodium bisulfite and hydrogen peroxide.

12. The process of claim 1, wherein after step (c) the membranes are flushed with water.

13. The process of claim 1 or 12, wherein steps (a) through (c) are repeated.

* * * * *